United States Patent [19]
Luzzatto

[11] Patent Number: 5,689,802
[45] Date of Patent: Nov. 18, 1997

[54] TWO-WAY RADIO WITH TRANSMIT MODE AND REPEAT MODE

[75] Inventor: Ariel Luzzatto, Holon, Israel

[73] Assignee: Motorola, Inc., Schaumburg, Ill.

[21] Appl. No.: 410,257

[22] Filed: Mar. 24, 1995

[51] Int. Cl.[6] .................................................. H04B 07/15
[52] U.S. Cl. ............................ 455/11.1; 455/18; 455/68; 455/88; 455/89
[58] Field of Search ........................ 455/11.1, 18, 49.1, 455/15, 54.1, 54.2, 70, 73, 68, 88, 89, 66, 92, 38.1, 38.2, 7; 379/58, 57, 62, 63, 67, 68, 88, 89; 381/77; 369/6, 7, 19; 340/825.44, 825.54, 825.69, 825.72

[56] References Cited

U.S. PATENT DOCUMENTS

| | | | |
|---|---|---|---|
| 3,699,443 | 10/1972 | Weger | 455/11.1 |
| 3,955,140 | 5/1976 | Stephen et al. | 455/11.1 |
| 4,468,813 | 8/1984 | Burke et al. | 455/38.2 |
| 5,251,327 | 10/1993 | Lenchik et al. | 455/54.2 |
| 5,371,901 | 12/1994 | Reed et al. | 455/69 |
| 5,448,534 | 9/1995 | Okada | 369/6 |

*Primary Examiner*—Reinhard J. Eisenzopf
*Assistant Examiner*—Philip J. Sobutka
*Attorney, Agent, or Firm*—Frank J. Bogacz; Robert M. Handy

[57] ABSTRACT

A two-way radio having a receiver (20) for receiving a radio signal including a voice message, a storage element (45) coupled to the receiver for storing the voice message received, a voice input device (49) for inputting voice messages, a user-actuable selection input (15) for receiving a user input to change between a transmit mode and a repeat mode and a transmitter (21) selectively coupled to the storage element and the voice input device for selectively transmitting input voice messages when in the transmit mode and retransmitting the stored voice message when in the repeat mode. A detection circuit (47) detects the radio signal and a control circuit (50) coupled to the receiver, the transmitter and the detection circuit operates in the repeat mode for activating the transmitter (21) to retransmit the voice message when the detection circuit (47) detects that the radio signal ends.

3 Claims, 1 Drawing Sheet

TWO-WAY RADIO WITH TRANSMIT MODE AND REPEAT MODE

FIELD OF THE INVENTION

This invention relates to a two-way radio having a transmit mode and a repeat mode.

BACKGROUND OF THE INVENTION

It often happens in a military radio net, that two vehicles, namely vehicle A and vehicle B, carrying a radio transceiver each, are temporarily not able to contact each other because of adverse terrain conditions. However, since the radio net generally comprises more than two vehicles, it generally happens that a third vehicle, namely vehicle C, which is placed in a favourable position, is capable to receive both A and B. In this case, is customary that A (or B) requests C to mediate, i.e.:

A asks C to report to B his message.

A transmits to C a sentence and asks C to confirm understanding.

C confirms understanding.

C (who can hear both A and B) contacts B, reports to him the content of the sentence that A transmitted and asks B to confirm understanding.

B confirms understanding.

Then C returns to A, reports that B understood the first sentence, and then asks A for the next sentence to transmit to B.

The procedure goes on until the all message content sent by A is received and acknowledged by B.

The same will now happen when B wants to transfer his response to A.

This procedure is very slow and problematic because it requires C to understand the content and confirm, transfer the content to B and request B to confirm, and then going back to A to notify him that his message went through.

SUMMARY OF THE INVENTION

According to a first aspect of the invention, a two-way radio is provided comprising a receiver for receiving a radio signal including a voice message; a storage element coupled to the receiver for storing the voice message received; a voice input device for inputting voice messages; a user-actuable selection input for receiving a user input to change between a transmit mode and a repeat mode; and a transmitter selectively coupled to the storage element and the voice input device for selectively transmitting input voice messages when in the transmit mode and retransmitting the stored voice message when in the repeat mode. A detection circuit for detects the radio signal and a control circuit coupled to the receiver, the transmitter and the detection circuit and activates the transmitter, when in the repeat mode, to retransmit the voice message when the detection circuit detects that the radio signal ends.

In accordance with a second aspect of the invention, a two-way radio is provided comprising: a receiver for receiving a radio signal including a voice message and signalling information; a storage element coupled to the receiver for storing the voice message received; a voice input device for inputting voice messages; a signalling decoder for decoding the signalling information; and a transmitter selectively coupled to the storage element and the voice input device and operable in a transmit mode and a repeat mode, for selectively transmitting input voice messages when in the transmit mode and retransmitting the stored voice message when in the repeat mode. A detection circuit detects the radio signal and a control circuit coupled to the receiver, the transmitter, the signalling decoder and the detection circuit, operates to change the transmitter from transmit mode to the repeat mode in response to the decoder decoding the signalling information. When in the repeat mode the control circuit operates to activate the transmitter to retransmit the voice message when the detection circuit detects that the radio signal ends.

A preferred embodiment of the invention is now described, by way of example only, with reference to the drawings.

DETAILED DESCRIPTION OF THE DRAWINGS

Figure 1:
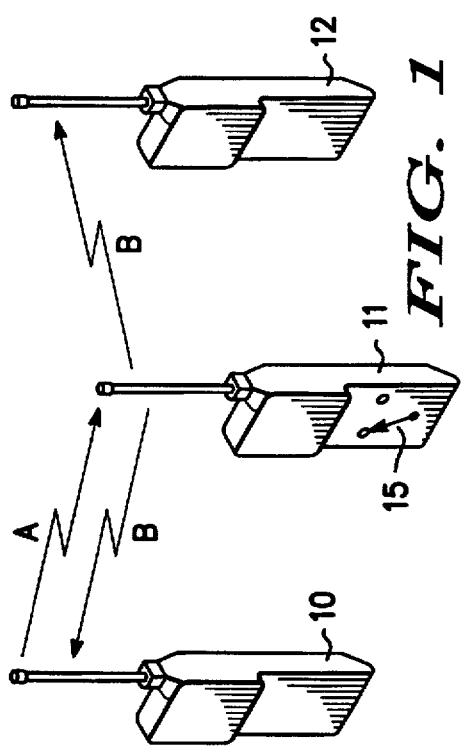
FIG. 1 illustrates three two-way radios, at least one of which is operating in accordance with the preferred embodiment of the invention.

Referring to FIG. 1, a scenario is illustrated where three two-way radios are operating in the same system. The system is a "conventional" system in that there is no central trunking controller.

The situation is illustrated where radio 12 is out of range of radio 10, but each of radios 10 and 12 is within range of radio 11.

The operation of the three radios in outline terms is as follows. Radio 11 has a user-actuable selection input such as a switch 15, allowing its user to put the radio in either a normal mode or a "forward" (i.e. "repeat") mode. The user of radio 10 transmits a voice message to radio 11 asking the user of radio 11 to enter the "forward" mode. When radio 11 is in the "forward" mode, operation is as follows.

The user of radio 10 transmits a voice message, illustrated as message A. This message is received by radio 11 and stored at radio 11. As soon as message A terminates, this is sensed by radio 11 and radio 11 retransmits the voice message just stored. This is illustrated as message B. The retransmitted voice message is heard by both radios 10 and 12, since both are in contact with radio 11. Thus, radio 12 receives the original message from radio 10, with the original speaker voice, without misunderstandings and interpretation problems. At the same time, the user of radio 10 hears his own voice retransmitted by radio 11 and this has the advantage of providing an acknowledgement to radio 10 that the message has been retransmitted.

Figure 2:
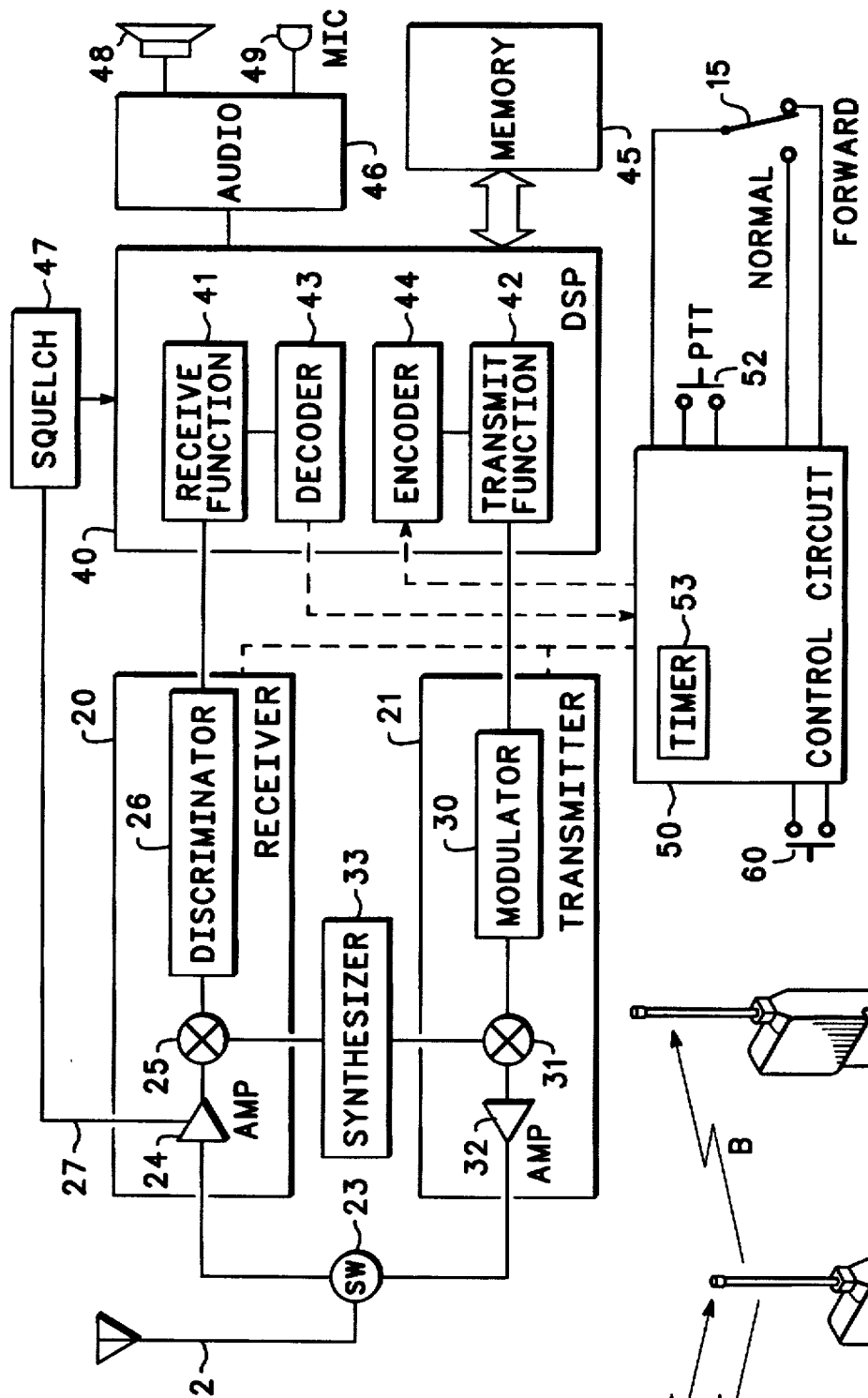
FIG. 2 is a block diagram of a radio in accordance with the preferred embodiment of the invention.

Preferred details of radio 11 are shown in FIG. 2. Radio 11 comprises a receiver part 20 and a transmitter part 21, each connected to an antenna 22 via an antenna switch 23. Receiver part 20 may take a number of different forms, but by way of example it is shown as comprising a pre-amplifier 24, a mixer 25 and a discriminator 26. The pre-amplifier 24 has an RSSI or "squelch" output 27. Similarly, the transmitter part 21 may take a number of different forms, but by way of example it is shown as comprising a modulator 30, a mixer 31 and a power amplifier 32. Connected to the mixers 25 and 31 is a synthesizer 33.

Connected to the receiver part 20 and the transmitter part 21 is a digital signal processor 40 having a receive base-band processing functions 41, transmit function 42, a signalling decoder function 43 and a signalling coder function 44. Connected to the digital signal processor (DSP) 40 is a random access memory (RAM) 45, an audio circuit 46 and a squelch detect circuit 47. In place of random access memory 45, a first-in, first-out shift register can be provided. Connected to the audio circuit 46 are a loudspeaker 48 and a microphone 49. Control circuitry 50 is provided, controlling the receiver part 20 and the transmitter 21 and receiving signalling from the signalling decoder function 43 and activating the coder function 44. Connected to the control circuitry 50 is the two-way user actuable switch (for other user-actuable selection input) 15 and a push-to-talk (PTT) button 52. Control circuitry 50 is shown as being separate from the DSP 40 and can take the form of a separate integrated circuit or microprocessor. Alternatively the control circuitry 50 and the DSP 40 may be implemented in a single processor. These options are readily implemented by one skilled in the art.

The two-way switch 15 is shown as having a "forward" position and a "normal" position.

In the normal position of switch 15, the radio 11 operates as a conventional two-way radio. When a user presses the PTT button 52 and speaks into the microphone 49, speech is processed by the DSP 40 and speech data is passed to the transmitter part 21 and transmitted through the antenna 22. On releasing the PTT button 52 and receiving a radio signal including a voice message, the radio signal is received in the receiver part 20 and an audio signal from the output of the discriminator 26 is sampled by the DSP 40 and output via the audio circuit 46 and loudspeaker 48. Squelch detect circuit 47 controls the opening of the audio path between the DSP 40 and the loudspeaker 48, dependent on the level of signal measured at the squelch output 27 of the pre-amplifier 24 (as is known in the art).

Each of the radios 10, 11, 12 has circuitry identical of that of FIG. 2.

When the user of radio 10 requires radio 11 to switch to the "forward" mode, he simply transmits a voice message requesting the user of radio 11 to switch the switch 15 to the position shown in FIG. 2.

When radio 11 is in the "forward" mode, repeater operation is able to commence as follows.

The user of radio 10 presses his PTT button 52 twice and holds it down. This causes a retransmit request "code" to be generated in the signalling function 44 in the DSP 40 of the radio 10. The "retransmit request" code is present in the signal A in advance of any audio in that signal. The retransmit request code can take a number of forms. An example is a synchronization preamble, followed by a hexadecimal digit transmitted in FSK.

The "retransmit request" code is received by radio 11 in signalling decoder function 43 and causes control circuitry 50 to operate radio 11 in the "forward" mode. In this mode, received audio included in the receive radio signal is sampled by DSP 40 and transformed into digital data and stored in RAM 45. Up to 10 seconds of audio data can be stored in RAM 45.

As soon as the user of radio 10 releases his PTT, the transmitted signal ceases and squelch detect circuit 47 of radio 11 senses that the channel is free. In response to this sensing of free channel, the controller circuitry 50 of radio 11 automatically causes the audio data stored in RAM 45 to be output to the transmit function 42 and transmitted through the transmitter part 21. The user of radio 10 (the originator) will hear his own message echoed back by the repeater radio 11, which will notify him that his message has been retransmitted. Simultaneously the user of radio 12 will receive and hear the repeated message.

Thus the control circuitry 50 is coupled to the signalling decoder 43 to respond thereto by initiating the transmitter part 21 to retransmit the received voice message when the signalling information is received with the voice message and to operate in the transmit mode when the signalling information is not received.

If the user of radio 10 presses the PTT only once, no "retransmit request" code is pre-pended to the message A and retransmission by radio 11 will not occur. Signalling decoder 43 will not sense the "retransmit request" code and will not cause circuitry 50 to repeat the message. The radio 11 will operate in the transmit mode, notwithstanding that switch 15 is in the forward position.

When switch 15 is in the forward position, radio 11 can still be operated by the local operator, as long as neither radio 10 nor radio 12 presses a double PTT action. The user of radio 11 simply presses PTT 52 and speaks into the microphone 49. This feature has the advantage that one of the radios 10, 11, 12 in the network may be constantly left in the "forward mode", without causing any network malfunction.

If message A is more than 10 seconds in length, RAM 45 stores the last 10 seconds of the message. As an alternative arrangement, control circuitry 50 can include a ten-second timer 53 which automatically causes retransmission of the incoming message as soon as ten seconds have elapsed.

The features described have a further advantage in allowing propagation tests to be performed in the field. A radio, for example radio 11, can be positioned at a fixed location. A test engineer drives around, transmitting from radio 10 and hearing his own message retransmitted by way of confirmation that communication exists between the two points.

The capability of storing the last voice message can be utilised to provide an additional feature. If a user did not understand a message, he is able to replay it by pressing a "reply key" 60, instead of requesting the party to repeat a message. Replay key 60 causes control circuitry 50 to initiate reading out of the stored data from RAM 45 by DSP 40 and outputting of the stored audio signal through loudspeaker 48.

Further radios can be provided in a repeating chain, with several of them in the forward mode. A message can be repeated along the chain. For this to be successful, each repeating radio, for example radio 11, prepends the outbound message with the "retransmit request" code from its signalling function 44. In such operation, the originator radio 10 will hear the initial message repeated not once but several times, one repetition for each repeater in the chain.

I claim:

1. A two-way radio comprising:

a receiver for receiving a radio signal including a voice message;

a storage element coupled to the receiver for storing the voice message received;

a voice input device for inputting voice messages;

a user-actuable selection input for receiving a user input to change between a transmit mode and a repeat mode;

a transmitter selectively coupled to the storage element and the voice input device for selectively transmitting input voice messages when in the transmit mode and retransmitting the stored voice message when in the repeat mode;

a detection circuit for detecting the radio signal;

a control circuit coupled to the receiver, the transmitter and the detection circuit and operable in the repeat mode for activating the transmitter to retransmit the voice message when the detection circuit detects that the radio signal ends.

2. A radio according to claim 1 further comprising a signalling decoder for decoding signalling information included in the radio signal, wherein the control circuit is coupled to the signalling decoder to respond thereto by initiating the transmitter to retransmit the received voice message when the signalling information is received with the voice message and to operate in the transmit mode when the signalling information is not received.

3. A two-way radio comprising:

a receiver for receiving a radio signal including a voice message and signalling information;

a storage element coupled to the receiver for storing the voice message received;

a voice input device for inputting voice messages;

a signalling decoder for decoding the signalling information;

a transmitter selectively coupled to the storage element and the voice input device and operable in a transmit mode and a repeat mode, for selectively transmitting input voice messages when in the transmit mode and retransmitting the stored voice message when in the repeat mode;

a detection circuit for detecting the radio signal;

a control circuit coupled to the receiver, the transmitter, the signalling decoder and the detection circuit, where the control circuit is operable to change the transmitter from transmit mode to the repeat mode in response to the decoder decoding the signalling information and, when in the repeat mode, to activate the transmitter to retransmit the voice message when the detection circuit detects that the radio signal ends.

\* \* \* \* \*